United States Patent

[11] 3,532,131

| [72] | Inventor | Robert M. Lefere, Jackson, Mich. |
| --- | --- | --- |
| [21] | Appl. No. | 745,512 |
| [22] | Filed | July 17, 1968 |
| [45] | Patented | Oct. 6, 1970 |
| [73] | Assignee | Aeroquip Corporation, Jackson, Michigan |

[54] PRECHARGED FLEXIBLE REFRIGERATION ASSEMBLY
4 Claims, 2 Drawing Figs.

[52] U.S. Cl. .................................................. 138/114; 285/49
[51] Int. Cl. .................................................. F16l 11/14
[50] Field of Search ........................................... 138/114, 149, 121, 118; 285/49

[56] References Cited
UNITED STATES PATENTS

| 3,186,438 | 6/1965 | Holmgren .................... | 138/121 |
| --- | --- | --- | --- |
| 3,420,553 | 1/1969 | Poxon et al. .................. | 285/49 |

Primary Examiner—Louis K. Rimrodt
Attorney—Jerry K. Harness

ABSTRACT: The assembly embodies a charged length of tubing with sealed fittings at the ends for joining charged refrigeration units. The tubing between the end fittings is flexible, has insulating properties and has a smooth internal fluid path. The tubing supersedes the charged copper tubing heretofore employed.

Patented Oct. 6, 1970
3,532,131
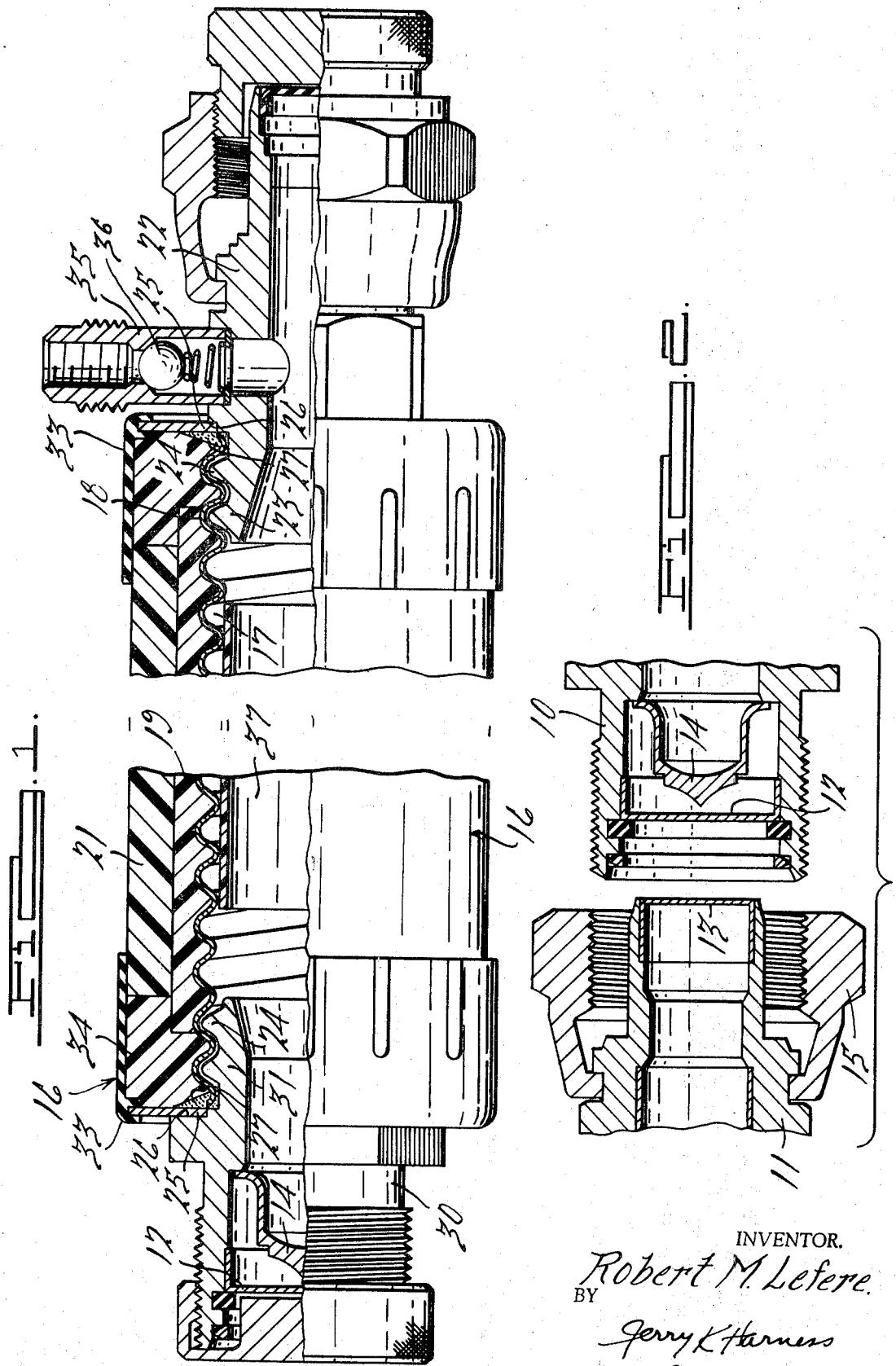
INVENTOR.
Robert M. Lefere.
BY
Jerry K Harness
his ATTORNEY.

PRECHARGED FLEXIBLE REFRIGERATION ASSEMBLY

BACKGROUND OF THE INVENTION

Reference may be had to assignee's patent to J. C. Abbey et al. No. 3,202,442 for a disclosure of a charge assembly employing copper tubing having end fittings which connect refrigeration units together.

SUMMARY OF THE INVENTION

A tube is constructed as a flexible sleeve from a seamed metal sheet strip which is corrugated as a thread and strengthened by a restraining sleeve of plastic material which is molded, extruded or otherwise bonded thereto. In most applications the plastic material has a sleeve of insulating material molded or otherwise secured thereover to provide a durable outer covering. A flexible sleeve of plastic material is slid or formed within the formed metal tube in close proximity with the internal threads thereof to provide a smooth path. An insulating layer of the contained fluid is retained between the sleeve and the tube thread. End fittings, of a type shown in the above patent but modified to have a thread thereon matable with the thread of the formed tube, are secured in this manner to the ends thereof in sealed relation thereto by solder, epoxy or like material. An epoxy resin or like bondable material is employed for bonding the ends of the restraining and insulating sleeves to the end fittings.

BRIEF DESCRIPTION OF THE DRAWING

FIG. 1 is a sectional view of end fittings on a flexible tube of the present invention which is charged with a fluid and connectable between units of a charged refrigeration system and FIG. 2 is a sectional view of a fitting on one end of the assembly of the present invention disposed in securable relation to a fitting on a refrigeration unit.

DESCRIPTION OF THE PREFERRED EMBODIMENT

In FIG. 2, a fitting 10 on the end of a tube of the present invention charged with a refrigerant fluid such as freon in either liquid or gas form and is constructed to provide a sealed connection with a fitting 11 on a refrigeration unit also charged with such a fluid. The fitting 10 has a diaphragm 12 engageable with a diaphragm 13 of the fitting 11 when in telescoped relation which are pierced by a blade 14 of the fitting 10 when a nut 15 is screwed upon the threaded end of the fitting 10 to form a passageway for the fluid between the sealed connected fittings. These specific connector fittings form no part of the present invention except for the modification thereof which secures the fittings to the ends of a conduit 16 illustrated in FIG. 1.

The copper conduit of the mentioned patent is difficult to bend and sometimes requires suitable tools for proper installation. Further, the copper will become kinked if repeatedly worked and being in direct contact with ambient air will cause condensation. The conduit of the present invention dampens vibration, does not kink and eliminates the expensive copper. Either of the end fittings 10 or 11 may be applied to the ends of the conduit 16 or one may be applied to one end and the other to the other end, as disclosed in FIG. 1.

The flexible conduit 16 has a central flexible tube 17 constructed to have a corrugated like threaded wall 18 which may be constructed in any suitable manner. One way of constructing the threaded tube is by using an elongated strip of sheet metal which is rolled into a tube with the edges in sealed relation and thereafter passed through a threading machine to apply the corrugated type of thread to the wall. The metal of the sleeve is thin so that the wall is extremely flexible. A restraining sleeve 19 is preferably molded or extruded directly to the outer surface of the threaded tube 17 which may be done during the time the thread is being formed or after the formation of the thread thereon. The restraining sleeve 19 is made of a plastic material such as polyvinylchloride which resists the expansion and elongation of the tube 17 under mechanical or internal pressure stresses. Upon the restraining sleeve 19 an insulating sleeve 21 is applied. In some cases it is possible to combine the properties of the sleeves 19 and 21 so that it is necessary to use only one sleeve instead of two. Although not shown in the drawings, it may be advisable to provide a coating of corrosion resistant material directly to the outer surface of the tubing as a rust inhibitor. Any suitable type may be used. This sleeve 21 may be stretched over the sleeve 19 and adhered thereto or may be molded to the sleeve 19 as it is being molded to the threaded tube 17. The sleeve 21 is made of an insulating plastic such as a type of foam material, one which will cure with a smooth outer surface. One such material is known in the art and procurable under the trade name Armaflex.

An end fitting 22, which is similar to the fitting 11 of FIG. 2 but which has an extending portion 23 containing a thread 24 is screwed within the thread 18 at one end of the tube 17. A washer 25 is passed over the threads 24 and is abutted against a shoulder 26 on the fitting 22. The washer 25, the extending portion 23 and the end of the threaded tube 17 are all secured together in fixed sealed relation to each other by a solder, epoxy or brazing material 27. The opposite end of the threaded tube 17 has a fitting 30 applied thereto which is similar to the fitting 10, illustrated in FIG. 2, except for an extension 31 on the inner end thereof. This portion has a thread 24 thereon which screws into the other end of the threaded tube 17 from that having the fitting 22 thereon. The washer 25 is applied against the shoulder 26 of the fitting 30 and the washer, sleeve and fitting are secured together in fixed relationship by a solder, epoxy or brazing material 27.

A cap 33 is secured over the washers 25 with the adjacent portion of the insulating sleeve 21 drawn back sufficiently to permit an epoxy resin 34 or other strong sealing material to be applied between the ends of the tube 17, the sleeves 19 and 21 and the washer 25 and solder, epoxy or brazing material 27 to bind them in tight sealed relation to each other. After the cap has been filled in this manner, the deflected ends of the sleeve 21 are returned into the cap 33 and any excess material which flows out of the cap is immediately cleaned therefrom and from the outer surface of the sleeve 21.

Before the end fittings 22 and 30 are applied to the tube 17, a sleeve 37 of plastic material, such as polyethylene, is slid or formed within the tube 17 in close proximity or in contact with the inner projections of the thread 18 to provide a smooth path for the fluid. Additional thermal insulation is also provided within the area between the thread and the sleeve 37. The sleeve not only provides the smooth path for the fluid but also aids in preventing vibration and a shrill sound which would occur when the fluid interacts with the individual corrugations of the tube. The phenomenon which causes the shrill "singing" sound when the corrugated tubing is used without the sleeve 37 is not known but it is believed to be caused by the aforementioned interaction of the freon with the corrugations at predetermined velocities and predetermined lengths of the tubing. In practice, this "singing" sound made the assembly without the sleeve 37 unacceptable. The use of the sleeve 37 provides a triple function. First, the relatively smooth bore of the sleeve eliminates the "singing" sound. Second, the fluid "captured" or retained between the outer surface of the sleeve 37 and the inner surface of the tube provides an additional layer of insulation thereby allowing less insulation on the outside of the tube. Naturally, there is some movement of the fluid at this location since this area is not sealed. Third, the fluid in the system generally carries a lubricant. The smooth bore of the sleeve 37 insures that the lubricant will not be deposited within the annular grooves of the tube corrugations. Should such deposits be allowed, a failure in one of the refrigerant components might well result.

It is to be understood that two of the same fittings 22 or 30 may be applied at the opposite ends of the conduit 16. It will also be noted that a charging valve 35 is carried by the fitting 22 in communication with the interior of the assembly. A sealing cap (not shown) is applied to the end of the valve 35 after a charging operation, the fluid being retained by a ball check 36.

Two charged refrigeration units having end fittings are joined by the present assembly in a manner as pointed out more specifically in the above-mentioned patent. The conduit 16 may be made in standard lengths and then cut to desired lengths with the ends of the sleeves 19 and 21 cut from the tube 17 to produce the end formations, as illustrated in FIG. 1. With such an arrangement a continuous length of a tube can be formed with a thread while the sleeve 37 is progressively inserted, the corrosion protection coating continuously applied and the sleeve 19 is progressively molded to the threaded section. As the sleeve 19 is progressively molded the sleeve 21 may be progressively molded thereon. After the application of material of the sleeve 19 to the tube 17 and the material of the sleeve 21 to the sleeve 19, to the conduit portion of the assembly is completed. The standard length of conduit, as pointed out above, may be cut to desired lengths and after the sleeves 19 and 21 are trimmed at the ends may have the fittings 22 and 30 screwed to the ends of the threaded tube 17 and soldered or brazed thereto. The ends of the assembly are further sealed by the application of epoxy thereto within the end caps 33.

The resulting assembly is exceedingly durable, eliminates noise caused by the passage of the fluid at certain velocities through the bends and the combination of the corrugated tubing and the plastic sleeve 19 provides good flexibility as well as end restraint. The assembly is insulated by the outer sleeve 21 and by the presence of sleeve 37 which retains the fluid between the threads 18. Sleeve 37 also provides a smooth path for the flow. The assembly eliminates the use of costly copper tube and permits bending to conform to most required curvatures between refrigerant units.

I claim:

1. A conduit assembly comprising an elongated, continuously corrugated metal tube, fitting means secured to each end of said tube for connecting said assembly into a fluid system, insulating means disposed around and engaging the outer surface of said tube, and a flexible sleeve loosely positioned within said tube and extending substantially its entire length, said sleeve being arranged within said tube to provide fluid communication between the bore of the tube and the area defined between the outside of said sleeve and the inner surface of said tube, the outer surface of said sleeve being adjacent the inner edges of the corrugations of said tube and the bore of said sleeve being substantially smooth.

2. The subject matter of claim 1 wherein said insulating means includes a layer of plastic material molded on said tube and filling the areas between the corrugations thereof to provide end restraint in said tube.

3. The subject matter of claim 1 wherein said insulating means includes a first layer of plastic material molded on the outer surface of said tube and a second layer of flexible material disposed on said first layer, the end portions of both layers being adjacent each said fitting means, and means at each end of said tube bonding together the end portions of said layers and said tube.

4. The subject matter of claim 1 wherein the opposite ends of said sleeve are spaced from the inner edges of the adjacent fittings.